(12) United States Patent
Wang et al.

(10) Patent No.: US 11,178,377 B2
(45) Date of Patent: Nov. 16, 2021

(54) METHODS AND APPARATUS FOR SPHERICAL REGION PRESENTATION (71) Applicant: MEDIATEK Singapore Pte. Ltd., Solaris (SG)

(72) Inventors: Xin Wang, San Jose, CA (US); Lulin Chen, San Jose, CA (US); Shuai Zhao, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 128 days.

(21) Appl. No.: 16/026,632

(22) Filed: Jul. 3, 2018

(65) Prior Publication Data
US 2019/0020863 A1 Jan. 17, 2019

Related U.S. Application Data (60) Provisional application No. 62/531,379, filed on Jul. 12, 2017.

(51) Int. Cl.
*H04N 13/161* (2018.01)
*H04N 21/4722* (2011.01)
(Continued)

(52) U.S. Cl.
CPC ......... *H04N 13/161* (2018.05); *H04N 13/243* (2018.05); *H04N 19/167* (2014.11);
(Continued)

(58) Field of Classification Search
CPC .. H04N 13/161; H04N 19/167; H04N 13/243; H04N 21/233; H04N 21/234345;
(Continued)

(56) References Cited

U.S. PATENT DOCUMENTS

2016/0148431 A1  5/2016  Seydoux et al.
2016/0191893 A1* 6/2016  Gewickey ............ H04N 13/388
                                                    386/223
(Continued)

FOREIGN PATENT DOCUMENTS

CN  101536101 A  9/2009
CN  106358035 A  1/2017
(Continued)

OTHER PUBLICATIONS

Stockhammer, T., MPEG Immersive Media, https://www.itu.int/en/ITU-T/studygroups/2017-2020/16/Documents/ws/201701ILE/S2P2-1701-01-19-MPEG_Immersive_Media_Thomas_Stockhammer.pdf, Jan. 18, 2017, retrieved Apr. 17, 2019, 64 pages.

(Continued)

*Primary Examiner* — Jae N Noh
(74) *Attorney, Agent, or Firm* — Wolf, Greenfield & Sacks, P.C.

(57) ABSTRACT

The techniques described herein relate to methods, apparatus, and computer readable media configured to process (e.g., encode and/or decode) multimedia data that includes a representation of a multimedia experience associated with at least one spherical region. At least one video portion of the multimedia data and at least one additional multimedia portion of the multimedia data are associated with the spherical region. The multimedia data, at least one video portion, and at least one additional multimedia portion present the multimedia experience associated with the spherical region.

16 Claims, 7 Drawing Sheets (51) Int. Cl.
  *H04N 21/4728* (2011.01)
  *H04N 21/81* (2011.01)
  *H04N 21/236* (2011.01)
  *H04N 21/2343* (2011.01)
  *H04N 19/167* (2014.01)
  *H04N 13/243* (2018.01)
  *H04N 21/233* (2011.01)

(52) U.S. Cl.
  CPC ..... *H04N 21/233* (2013.01); *H04N 21/23614* (2013.01); *H04N 21/234345* (2013.01); *H04N 21/4722* (2013.01); *H04N 21/4728* (2013.01); *H04N 21/816* (2013.01)

(58) Field of Classification Search
  CPC ......... H04N 21/23614; H04N 21/4722; H04N 21/4728; H04N 21/816
  USPC .................................................... 375/240.26
  See application file for complete search history.

(56) References Cited

U.S. PATENT DOCUMENTS

| | | | | |
|---|---|---|---|---|
| 2018/0332265 | A1* | 11/2018 | Hwang | H04N 13/178 |
| 2019/0320155 | A1* | 10/2019 | Wang | H04N 13/178 |
| 2019/0356894 | A1* | 11/2019 | Oh | G06F 3/012 |
| 2019/0364261 | A1* | 11/2019 | Hwang | H04N 13/161 |

FOREIGN PATENT DOCUMENTS

| | | |
|---|---|---|
| CN | 106383576 A | 2/2017 |
| CN | 106572353 A | 4/2017 |

OTHER PUBLICATIONS

Choi et al., OMAF DIS text with updates based on Berlin OMAF AHG meeting agreements, International Organisation for Standardisation, ISO/IEC JTC1/SC29/WG11 M40849, Jul. 2017, Torino, Italy, 70 pages.
No Author Listed [Koenen et al., Editors], International Organisation for Standardisation, ISO/IEC JTC1/SC29/WG11, N17331, Jan. 2018, Gwangju, Korea, 8 pages.
No Author Listed [Singer et al., Editors], Technologies under Consideration for ISOBMFF, International Organisation for Standardisation, ISO/IEC JTC1/SC29/WG11, MPEG2017/N17379, Jan. 2018, Gwangju, Korea, 39 pages.
No Author Listed, International Organisation for Standardisation, ISO/IEC JTC1/SC29/WG11 MPEG2018/N17543, Apr. 2018, La Jolla, USA, 24p.
No Author Listed, International Standard, Information technology—Coding of audio-visual objects, Part 12: ISO base media file format, ISO/IEC 14496-12, Fifth Edition, Feb. 20, 2015, 250 pages.
Wang et al., Deriving Composition Tracks in ISOBMFF with Track Grouping, International Organisation for Standardisation, ISO/IEC JTC1/SC29/WG11 MPEG2016/M40858, Jul. 2017, Torino, Italy, 8 pages.
Wang et al., Deriving Composition Tracks in ISOBMFF, International Organisation for Standardisation, ISO/IEC JTC1/SC29/WG11 MPEG2016/M40857, Jul. 2017, Torino, Italy, 20 pages.
Wang et al., Deriving VR ROI and Viewport related Tracks in ISOBMFF, International Organisation for Standardisation, ISO/IEC JTC1/SC29/WG11, MPEG2016/M40412, Apr. 2017, Hobart, Australia, 11 pages.
Wang et al., MPEG-B Part 10-Improvements on Carriage and Signaling of 2-Dimensional Spatial Region Information as Timed Metadata in ISOBMFF, International Organisation for Standardisation, ISO/IEC JTC1/SC29/WG11 MPEG2016/M40414, Apr. 2017, Hobart, Australia, 16 pages.
Wang et al., OMAF: Carriage and Signaling of Spherical Region Information as Timed Metadata in ISOBMFF, International Organisation for Standardisation, ISO/IEC JTC1/SC29/WG11 MPEG2016/M40527, Apr. 2017, Hobart, Australia, 11pages.
Wang et al., OMAF: VR Media Storage and Metadata Signaling for Viewport Dependent Contect Processing, International Organisation for Standardisation, ISO/IEC JTC1/SC29/WG11 MPEG2016/M40413, Apr. 2017, Hobart, Australia, 7 pages.
[No Author Listed], Information technology—MPEG systems technologies—Part 10: Carriage of timed metadata metrics of media in ISO base media file format / Amd 1 Carriage of spatial information. ISO/IEC 23001-10:2015/FDAM 1:2016(E), ISO/IEC JTC1/SC29/WG11 N16191. Jun. 2, 2016:8 pages.
[No Author Listed], Video effects and transitions in Premiere Pro. Adobe Premiere Pro. Apr. 3, 2018. 119 pages. https://helpx.adobe.com/premeire-pro/using/video-effects-transistions.html [last accessed Dec. 23, 2019].
Hyche, 12. The SMIL Transition Effects Module. W3 Working Draft. 16 pages. https://www.w3.org/TR/smil-boston/smil-transitions.html [last accessed Dec. 23, 2019].

* cited by examiner

310 → class SphereRegionSampleEntry(type) extends MetaDataSampleEntry(type) {
  SphereRegionConfigBox(); // mandatory
  Box[] other_boxes; // optional }

320 → class SphereRegionConfigBox extends FullBox('rosc', version = 0, flags) {
  unsigned int(8) shape_type;
  bit(7) reserved = 0;
  unsigned int(1) dynamic_range_flag; ←— 322
  if (dynamic_range_flag == 0) {
    unsigned int(32) static_hor_range; ←— 324
    unsigned int(32) static_ver_range;} ←— 326
  unsigned int(8) num_regions; }

330 → aligned(8) SphereRegionStruct(range_included_flag) {
  signed int(32) center_yaw; ←— 332
  signed int(32) center_pitch; ←— 334
  signed int(32) center_roll; ←— 336
  if (range_included_flag) {
    unsigned int(32) hor_range; ←— 338
    unsigned int(32) ver_range;} ←— 340
  unsigned int(1) interpolate;
  bit(7) reserved = 0; }

350 → aligned(8) SphereRegionSample() {
  for (i = 0; i < num_regions; i++)
    SphereRegionStruct(dynamic_range_flag) }

```
aligned(8) class TrackGroupTypeBox(unsigned int(32)
track_group_type) extends FullBox(track_group_type, version = 0,
flags = 0)
{
    unsigned int(32) track_group_id;
    // the remaining data may be specified for a particular
track_group_type }
```

METHODS AND APPARATUS FOR SPHERICAL REGION PRESENTATION

RELATED APPLICATIONS

This Application claims priority under 35 U.S.C. § 119(e) to U.S. Provisional Application Ser. No. 62/531,379 titled "METHODS FOR VR VIEWPORT EXPERIENCE PRESENTATION USING SPHERE REGION PRESENTATION TRACK GROUPING", filed Jul. 12, 2017, which is herein incorporated by reference in its entirety.

TECHNICAL FIELD

The techniques described herein relate generally to video coding, and particularly to presenting a spherical region experience, such as a virtual reality (VR) viewport experience, including techniques to group sphere region presentation information.

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for specifying spherical regions to provide for an enhanced viewport experience.

Some embodiments relate to a decoding method for decoding video data. The method includes receiving multimedia data comprising representation of a multimedia experience associated with at least one spherical region, determining at least one video portion of the multimedia data and at least one additional multimedia portion of the multimedia data associated with the spherical region, and rendering the at least one video portion and the at least one additional multimedia portion together to present the multimedia experience associated with the spherical region.

In some examples, determining the at least one video portion and the at least one additional multimedia portion includes identifying metadata specifying the at least one video portion and the at least one additional multimedia portion are associated with the spherical region, wherein the metadata is in a derived viewport video track, and determining the at least one video portion and the at least one additional multimedia portion based on the metadata.

In some examples, determining the at least one video portion and the at least one additional multimedia portion includes identifying metadata specifying the at least one video portion and the at least one additional multimedia portion are associated with the spherical region, wherein the metadata is in a track group box of a same type with a same track group identifier (id), and determining the at least one video portion and the at least one additional multimedia portion based on the metadata.

In some examples, identifying the at least one additional multimedia portion comprises identifying one or more of an audio track, a text track, and a caption track.

In some examples, the method includes identifying an additional feature associated with the spherical region, wherein the additional feature comprises an inter-spherical region transition effect comprising data indicative of a transition effect for a transition from the spherical region to a second spherical region. The transition effect can include one or more of: a period of the transition; a range of a location of the spherical region to a second location of the second spherical region; an audio effect for the transition; and a video effect for the transition.

Some embodiments relate to an apparatus configured to decode video data. The apparatus includes a processor in communication with memory, the processor being configured to execute instructions stored in the memory that cause the processor to receive multimedia data comprising representation of a multimedia experience associated with at least one spherical region, determine at least one video portion of the multimedia data and at least one additional multimedia portion of the multimedia data associated with the spherical region, and render the at least one video portion and the at least one additional multimedia portion together to present the multimedia experience associated with the spherical region.

In some examples, determining the at least one video portion and the at least one additional multimedia portion includes identifying metadata specifying the at least one video portion and the at least one additional multimedia portion are associated with the spherical region, wherein the metadata is in a derived viewport video track, and determining the at least one video portion and the at least one additional multimedia portion based on the metadata.

In some examples, determining the at least one video portion and the at least one additional multimedia portion includes identifying metadata specifying the at least one video portion and the at least one additional multimedia portion are associated with the spherical region, wherein the metadata is in a track group box of a same type with a same track group identifier (id), and determining the at least one video portion and the at least one additional multimedia portion based on the metadata.

In some examples, identifying the at least one additional multimedia portion comprises identifying one or more of an audio track, a text track, and a caption track.

In some examples, the instructions further cause the processor to identify an additional feature associated with the spherical region, wherein the additional feature comprises an inter-spherical region transition effect comprising data indicative of a transition effect for a transition from the spherical region to a second spherical region. The transition effect can include one or more of: a period of the transition; a range of a location of the spherical region to a second location of the second spherical region; an audio effect for the transition; and a video effect for the transition.

Some embodiments relate to a method for encoding video data. The method includes encoding multimedia data comprising representation of a multimedia experience associated with at least one spherical region; encoding at least one video portion of the multimedia data and at least one additional multimedia portion of the multimedia data associated with the spherical region; and providing the encoded multimedia data, at least one video portion, and at least one additional multimedia portion to present the multimedia experience associated with the spherical region.

In some examples, encoding the at least one video portion and the at least one additional multimedia portion comprises encoding metadata specifying the at least one video portion and the at least one additional multimedia portion are associated with the spherical region, comprising encoding the metadata in a derived viewport video track.

In some examples, encoding the at least one video portion and the at least one additional multimedia portion comprises encoding metadata specifying the at least one video portion and the at least one additional multimedia portion are associated with the spherical region, comprising encoding the metadata in a track group box of a same type with a same track group identifier (id).

In some examples, the method includes encoding an additional feature associated with the spherical region, wherein the additional feature comprises an inter-spherical region transition effect comprising data indicative of a transition effect for a transition from the spherical region to a second spherical region.

Some embodiments relate to an apparatus for encoding video data. The apparatus includes a processor in communication with memory, the processor being configured to execute instructions stored in the memory that cause the processor to encode multimedia data comprising representation of a multimedia experience associated with at least one spherical region, encode at least one video portion of the multimedia data and at least one additional multimedia portion of the multimedia data associated with the spherical region, and provide the encoded multimedia data, at least one video portion, and at least one additional multimedia portion to present the multimedia experience associated with the spherical region.

In some examples, encoding the at least one video portion and the at least one additional multimedia portion comprises encoding metadata specifying the at least one video portion and the at least one additional multimedia portion are associated with the spherical region, comprising encoding the metadata in a derived viewport video track.

In some examples, encoding the at least one video portion and the at least one additional multimedia portion comprises encoding metadata specifying the at least one video portion and the at least one additional multimedia portion are associated with the spherical region, comprising encoding the metadata in a track group box of a same type with a same track group identifier (id).

In some examples, the instructions further cause the processor to encode an additional feature associated with the spherical region, wherein the additional feature comprises an inter-spherical region transition effect comprising data indicative of a transition effect for a transition from the spherical region to a second spherical region.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

Various techniques can be used to specify spherical region content and/or associated metadata to present a user with robust experiences.

The inventors have found that existing video techniques, such as VR techniques, only provide for using the video and audio in the one multimedia file. Such techniques do not allow for robust spherical regions (e.g., viewports), such as spherical regions that specify different viewports and different multimedia content, including non-video multimedia content and/or other metadata. The inventors have developed technological improvements to spherical region techniques. In some embodiments, a sphere region can be specified by grouping all of the relevant media and/or metadata tracks that relate to the spherical region experience. In some embodiments, the spherical regions can be enhanced by including metadata related to the spherical region experience, such as a transition effect when changing from one spherical region to another spherical region, and/or other experiences. In some embodiments, grouping and hierarchical techniques can be used to group the spherical region multimedia and/or metadata in a manner that allows the spherical regions to be derived in manners not otherwise supportable when using existing techniques.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
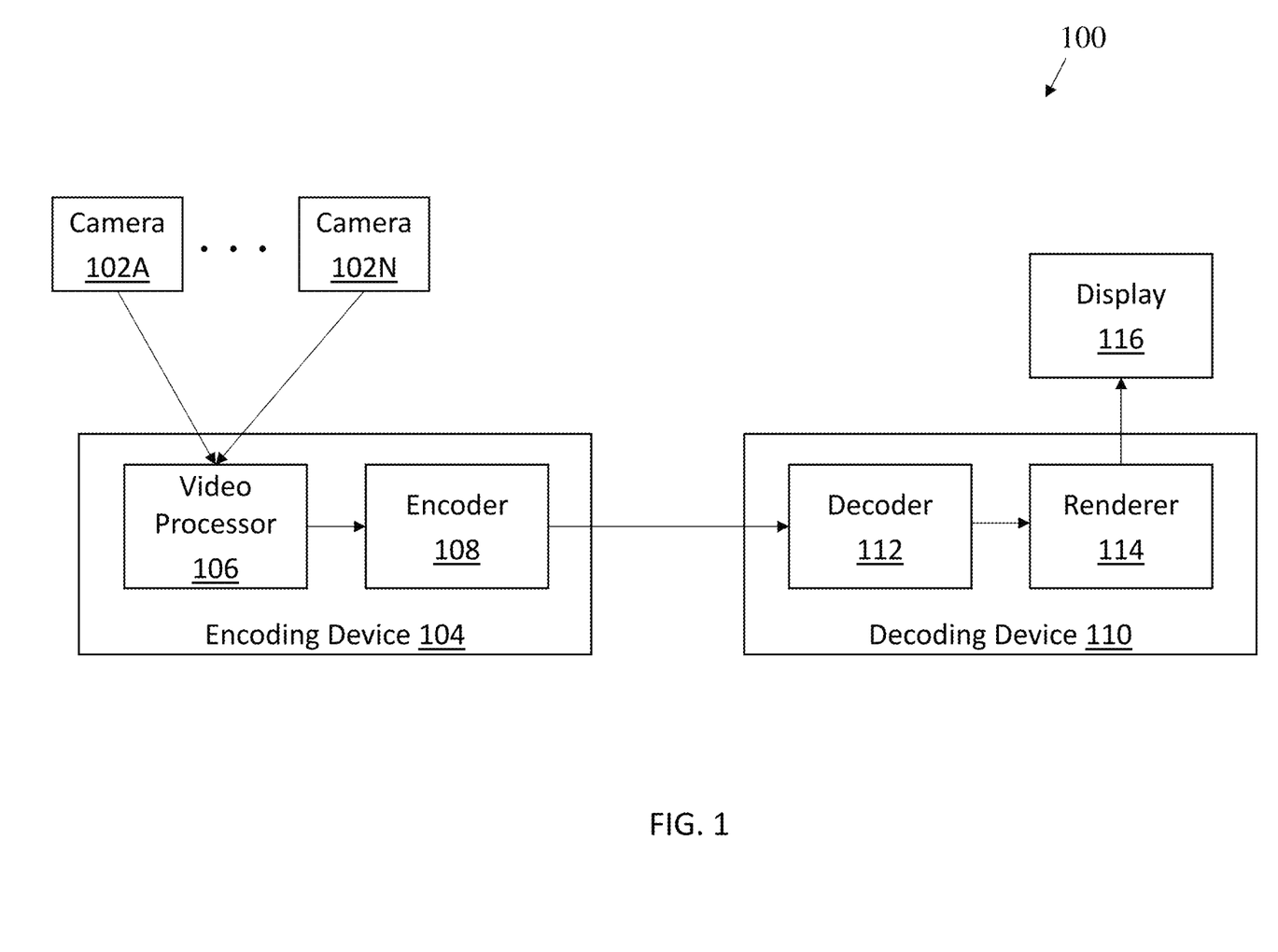
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a sphere. The display 116 displays the rendered content from the renderer 114.

A region of interest (ROI) is somewhat similar in concept to viewport. An ROI may, for example, represent a region in 3D or 2D encodings of omnidirectional video. An ROI can have different shapes (e.g., a square, or a circle), which can be specified in relation to the 3D or 2D video (e.g., based on location, height, etc.). For example, a region of interest can represent an area in a picture that can be zoomed-in, and corresponding ROI video can be displayed for the zoomed-in video content. In some implementations, the ROI video is already prepared separately. In such implementations, a region of interest typically has a separate video track that carries the ROI content. Thus, the encoded video can be used to specify the ROI, and how the ROI video is associated with the underlying video.

ROI or viewport tracks, such as separately encoded ROI tracks, can be associated with main video. For example, an ROI can be associated with a main video to facilitate zoom-in and zoom-out operations, where the ROI is used to provide content for a zoom-in region. For example, MPEG-B, Part 10, entitled "Carriage of Timed Metadata Metrics of Media in ISO Base Media File Format," dated Jun. 2, 2016 (w16191), which is hereby incorporated by reference herein in its entirety, describes an ISO Base Media File Format (ISOBMFF) file format that uses a timed metadata track to signal that a main 2D video track has a 2D ROI track.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
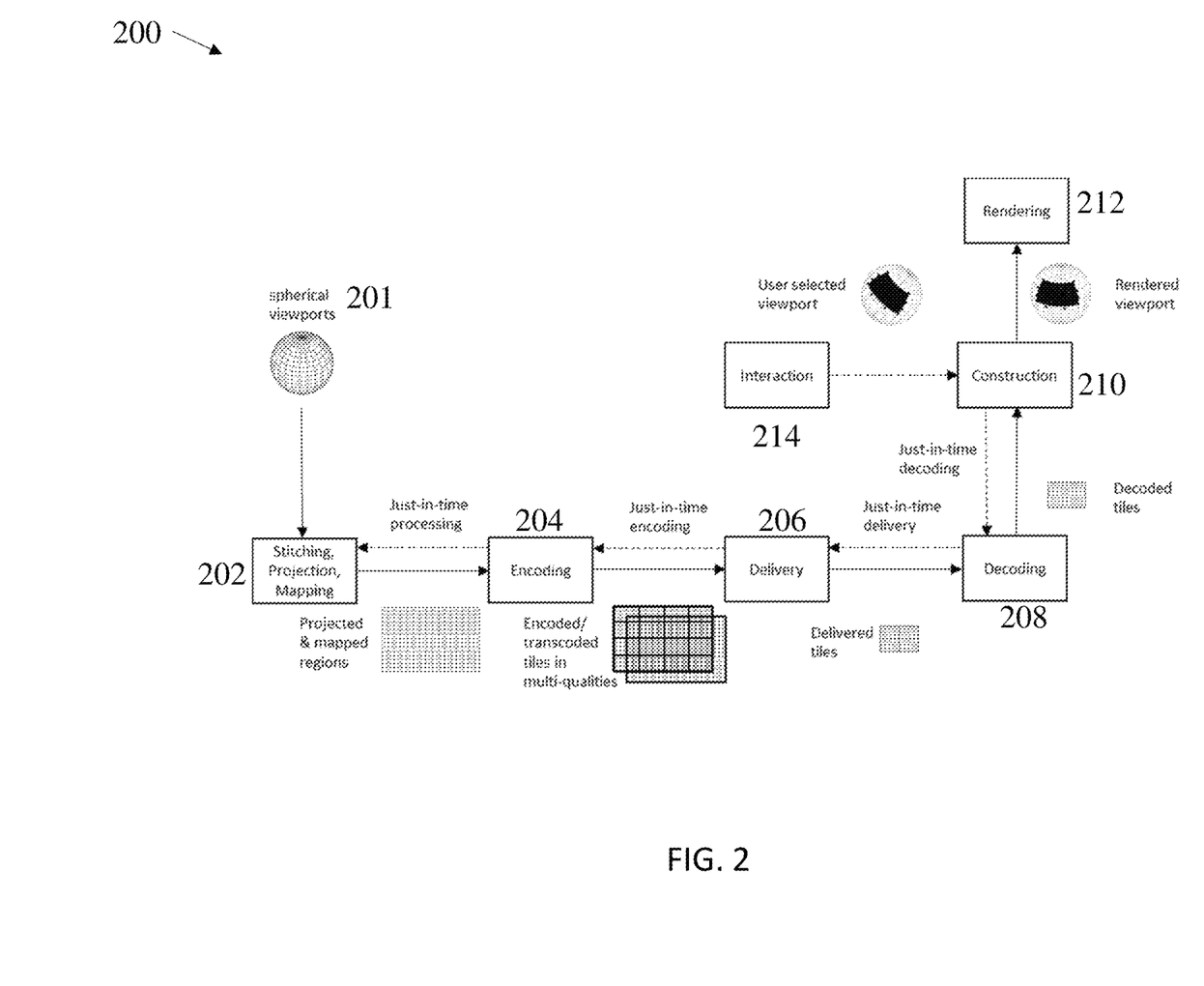
FIG. 2 a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. However, the viewport (e.g., a type of spherical region) can change and is therefore not static.

For example, as a user moves their head, then the system needs to fetch neighboring tiles (or sub-pictures) to cover the content of what the user wants to view next. Spherical region/viewport dependent processing techniques do not allow for specifying more than just the video content associated with a spherical region (e.g., a viewport).

As discussed above, existing media delivery methods provide for specifying spherical regions. For example, the latest draft of the Omnidirectional Media Format (OMAF) specification is described in m40849, entitled "OMAF DIS text with updates based on Berlin OMAF AHG meeting agreements," MPEG 119th meeting, July 2017, which is hereby incorporated by reference herein in its entirety. Generally, OMAF allows for specifying metadata in timed metadata tracks for the location, shape and size of the viewport. In particular, the current support for viewport signaling in the OMAF specification is through a generic timed metadata track syntax for indicating sphere regions. OMAF also includes specialized syntaxes, such as for the "initial viewport" (e.g., the viewport that shows when turned on) and potentially other "recommended viewport" timed metadata tracks. These metadata tracks are associated with one or more spherical media tracks with the new reference type 'cdtg' to indicate that there are regions on the spherical content represented by these media tracks in combination.

Figure 3:
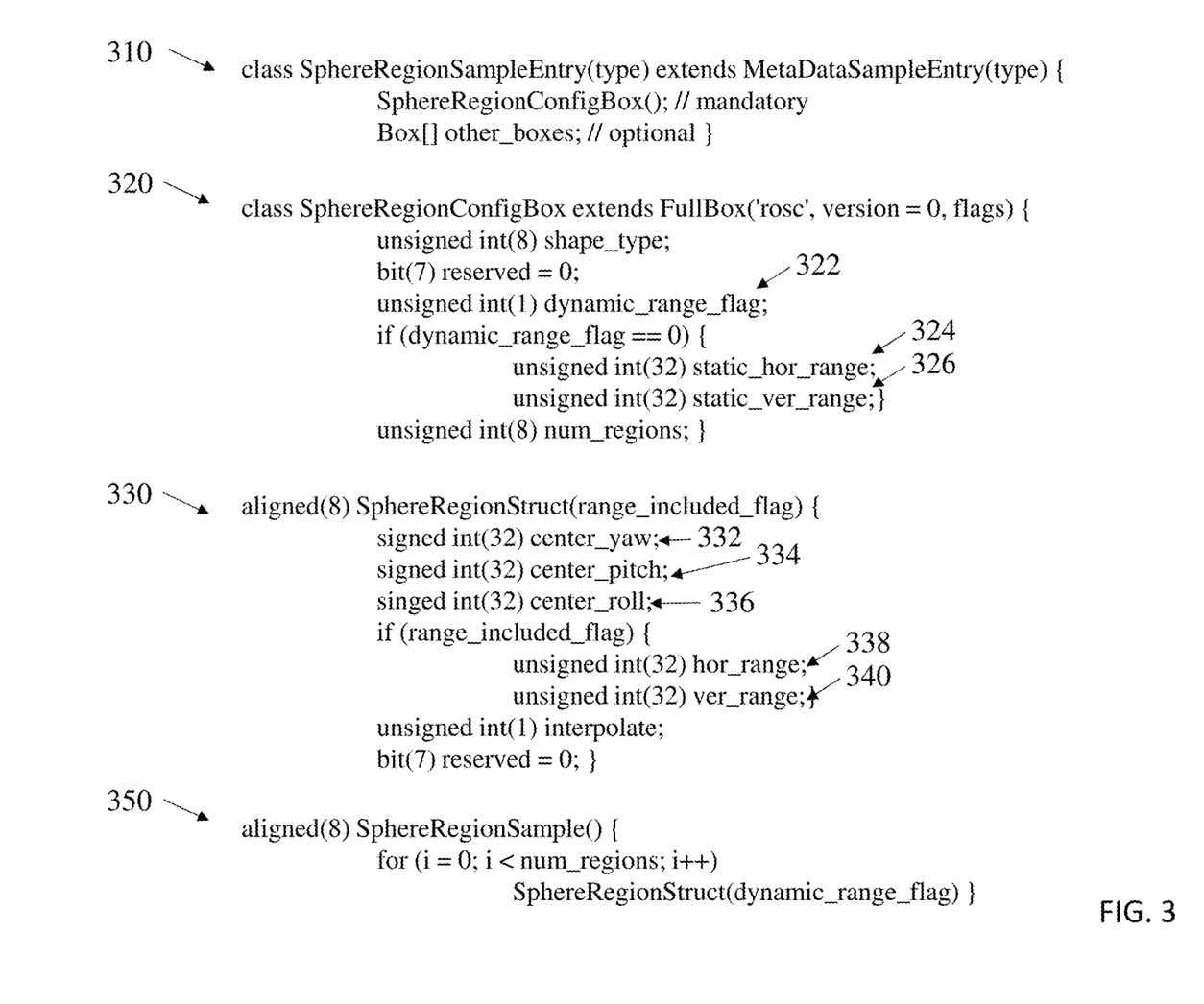
FIG. 3 illustrates examples of timed metadata track syntaxes, according to some examples.

FIG. 3 illustrates examples of timed metadata track syntaxes, according to some examples. The syntaxes refer to a sphere region ("SphereRegion"). As noted above, a viewport is a special type of SphereRegion. The SphereRegionSampleEntry syntax 310 specifies the SphereRegionSampleEntry, which includes one SphereRegionConfigBox. The SphereRegionConfigBox syntax 320 that specifies the shape of the sphere region specified by the samples. The dynamic_range_flag 322 can be used to indicate whether the ranges of the sphere region change, and therefore whether the viewport is static or dynamic (e.g., moving or not). For example, even if a user doesn't move, the viewport may (or may not) move on the sphere. In some implementations, if set equal to 0, the dynamic_range_flag 322 specifies that the horizontal and vertical ranges of the sphere region remain unchanged in all samples referring to this sample entry; if set equal to 1, the dynamic_range_flag 322 specifies that the horizonal and vertical ranges of the sphere region are indicated in the sample format. The static_hor_range 324 and static_ver_range 326 can specify the horizontal and vertical ranges, respectively, of the sphere region for each sample referring to this sample entry in units of 2-16 degrees. As discussed in the draft OMAF specification, the static_hor_range 324 and static_ver_rnge 326 can specify the ranges through the center point of the sphere region.

Each sample specifies a sphere region, and the SphereRegionSample structure 350 can include a SphereRegionStruct 330. The center_yaw 332, center_pitch 334, and center_roll 336 can specify the viewport orientation relative to the global coordinate axes. The center_yaw 332 and center_pitch 334 can indicate the center of the viewport, and center_roll 336 can indicate the roll angle of the viewport. The hor_range 338 and ver_range 340, when present, can specify the horizontal and vertical ranges, respectively, of the sphere region specified by this sample.

However, in many cases, it is desirable to render a viewport experience through not only its own sphere region video, but also, for example, other related media (e.g., audio, text and subtitle media) and/or metadata specifically prepared for the presentation of that viewport. For example, it can be desirable to use metadata when it is a recommended viewport, such as when the user does not have control of the viewing orientation and/or when the user has released control of the viewing orientation. Another desired use case is when a recommended viewport can have various associated audio and/or other multimedia. For example, if the recommended viewport is a tourist spot or trail, for which one or more guide audio tracks specific to the spot or trail may be available (e.g., in different languages), and different recommended viewports can have different guide audio tracks that are different from background music audio tracks. A further example of a use case is to allow a VR user to interact with a number of "recommended viewports" (e.g., storylines) by listening (e.g., and watching) in on the conversations of others in the experience. For example, the user can follow one story at a time and/or jump between stories by simply looking around.

As discussed above, existing techniques only provide for specifying metadata for video data. The inventors have discovered and appreciated that there is a need to signal a complete set of relevant media content (e.g., not only the relevant video, but also other content, such as audio and subtitle media) and/or metadata for presenting a viewport experience, so that individual viewport experiences can be presented accordingly. Therefore, simply using sphere region timed metadata to signal the existence of a viewport of interest is not sufficient.

The inventors have developed technical improvements to existing spherical region techniques, including for VR viewport experience presentation. The techniques can include a sphere region presentation track grouping, as discussed further herein. The sphere region presentation track grouping can be used, for example, for the projected omnidirectional video considered in the latest OMAF specification document, referenced above. The techniques can include options to enhance the grouping method for signaling additional features. For example, the techniques can provide for inter-viewport transition effects that can be used when changing from one viewport to another viewport. The techniques can also improve the grouping efficiency by using a hierarchical track derivation for viewports. The techniques can extend track grouping mechanisms (e.g., such as prior mechanisms in ISOBMFF) for signaling viewport specific experiences in consuming VR content in the context of OMAF.

Figure 4:
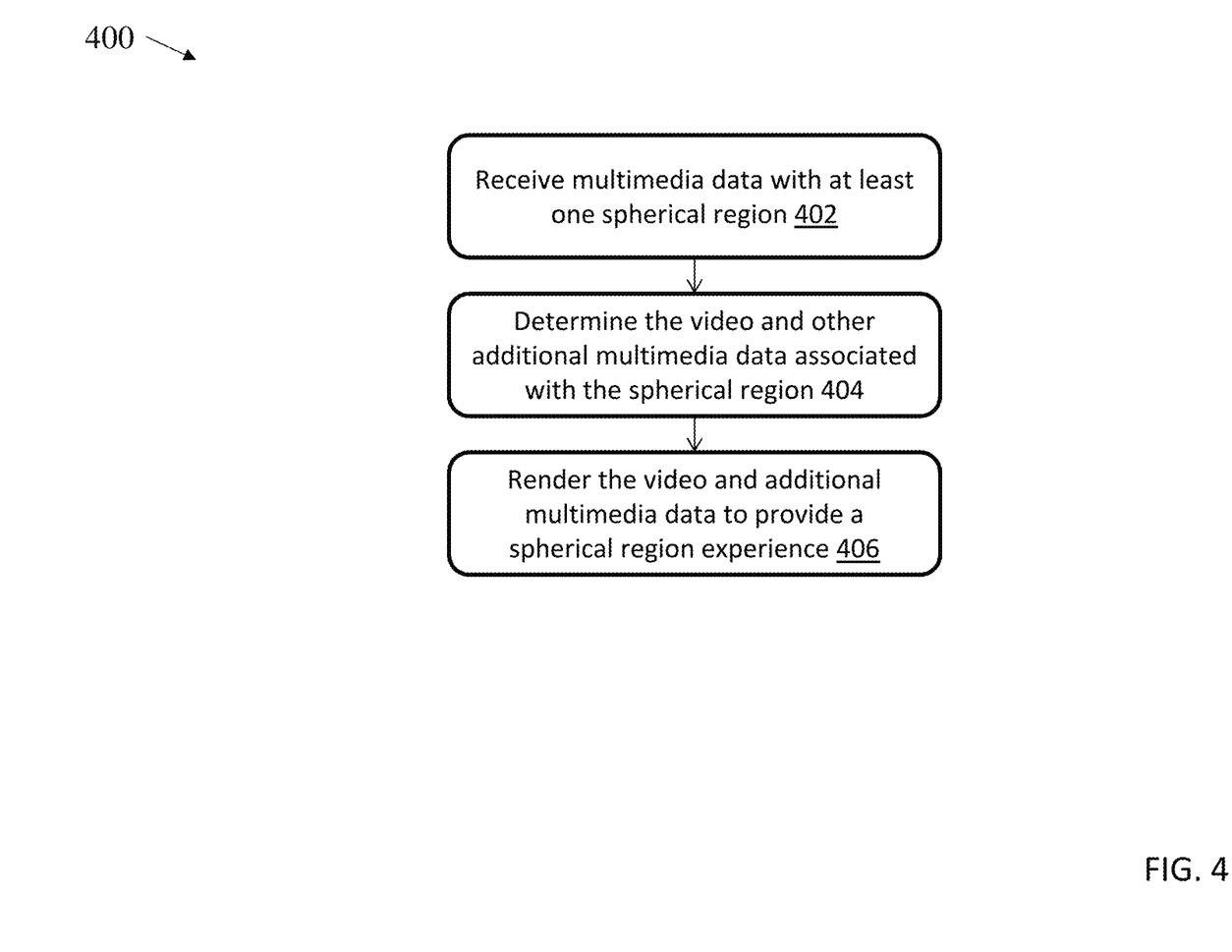
FIG. 4 is an exemplary computerized method for rendering a spherical region, according to some embodiments.

FIG. 4 is an exemplary computerized method for rendering a spherical region, according to some embodiments. At step 402, the device (e.g., decoding device 110) receives multimedia data with at least one spherical region. At step 404, the device determines video data and additional multimedia data (e.g., audio, subtitle, caption data) and/or metadata that is associated with the spherical region. For example, the device can determine the associated multimedia data and/or metdata for the spherical region using a sphere region presentation track grouping, discussed further herein. At step 406, the device renders the at least one video portion and the at least one additional multimedia portion together to present the spherical region.

Referring to step 404, a sphere region presentation track grouping can be used for projecting omnidirectional video. The sphere region presentation track grouping can be specified, for example, when each of the tracks that are related to a sphere region experience presentation contains a certain type of track group box. For example, the tracks can have a track group box with the track_group_type equal to 'psrp' and a same track_group_id value. Therefore, this grouping box can be used in each of the tracks to indicate what experience the tracks belong to. These tracks can be any media and/or metadata tracks, including (projected and/or non-projected) visual, audio, timed text and timed metadata tracks. The tracks belonging to a same track group of this type can be used collectively to present a multimedia experience by themselves. For example, if a receiving device is rendering content from a sphere region presentation track group, the receiving device can consider the (media and/or metadata) content from all the tracks within the group (e.g., there may be some other data selected from visual, audio, text, captions and/or other related data that may need to be considered when rendering the spherical region, in addition to the traditionally associated video).

One or more constraints can be specified for tracks that belong to a sphere region presentation track grouping. In some embodiments, the constraints can be specified by a specific track group type to indicate a sphere region presentation track grouping with one or more specific constraints (e.g., such as constraints discussed herein). In some embodiments, these constraints can be specified as either mandatory or optional attributes of the sphere region presentation track grouping box, such as the one of type equal to 'psrp'.

As an example of a constraint, only one timed metadata track can be mapped to the tracks of the group. For example, a constraint can be used such that there is only one sphere region timed metadata track mapped to the grouping for each track_group_id value. The sphere region timed metadata track can be linked, for example, with a 'cdtg' track reference, to all the video tracks mapped to this grouping with the same track_group_id value. This timed metadata track can be used to signal or specify one or more sphere regions that the track group multimedia experience is associated with.

Another example of a constraint can be that there is at least one video track mapped to the grouping for each track_group_id value. The video content of all the video tracks mapped to the grouping with the same track_group_id value can cover the sphere region signaled by the sphere region metadata track mapped to this grouping with the same track_group_id value, e.g. in order to provide the visual experience of the track group.

A further example of a constraint can be that all tracks mapped to the grouping with a same track_group_id value belong to a track group, called a projected sphere region presentation group. The projected sphere region presentation group can be sufficient for a multi-media (e.g., video and other media viewport experience) presentation of the sphere region signalled by the projected sphere region timed metadata track presentation in the group, wherein all the visual tracks are 2D visual tracks whose content represent the sphere region projected onto the 2D plane.

One or more constraints can be imposed for timed metadata tracks that are mapped to the grouping. For example, for the sphere region timed metadata track mapped to the grouping, the 'num_regions' shall be equal to 1, to indicate that the sphere region timed metadata track only signals one sphere region that the track group multimedia experience is associated with.

One or more constraints can be imposed for the video tracks mapped to the grouping. A constraint can be that each video track mapped to the grouping shall have a sample entry type equal to 'resv.' The scheme_type can be equal to 'podv' in the SchemeTypeBox included in the sample entry, e.g. to indicate that the video tracks are projected omnidirectional video tracks containing either monoscopic or stereoscopic content, according to the MPEG Omnidirectional Media Format.

Another constraint can be that the content of all the instances of the ProjectionFormatBox included in the sample entries of the tracks mapped to the same projected sphere region presentation track group are the same, e.g. to indicate the associated projection formats for the projected video tracks in the group are the same.

A constraint can be that the content of all the instances of the RegionWisePackingBox included in the sample entries of the tracks mapped to the projected sphere region presentation track group are the same, e.g. to indicate the associated region-wise packing mechanisms for the packed video tracks in the group are the same.

Another constraint can be that the content of all the instances of the ProjectionOrientationBox included in the sample entries of the tracks mapped to the projected sphere region presentation track group are the same, e.g. to indicate the associated projection orientations for the projected video tracks in the group are the same.

Figure 5:
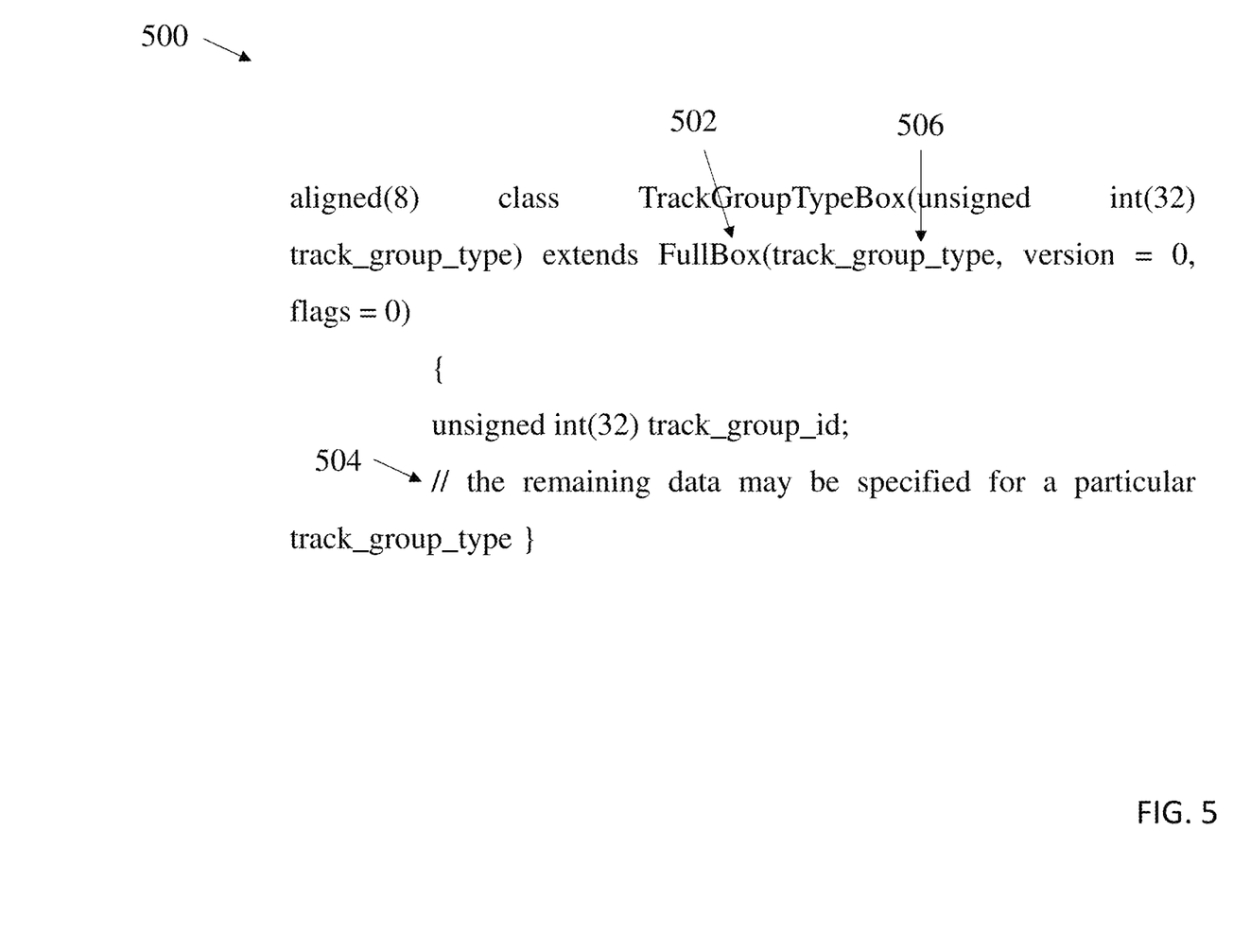
FIG. 5 shows an example extension of a track group box type, according to some embodiments.

In some embodiments, the track group box can be extended, such as to specify additional metadata related to a spherical region. An example of a track group type box is that specified in the ISOBMFF, ISO/IEC 14496-12, "Information technology—Coding of audio-visual objects: ISO base media file format", $5^{th}$ Edition, May 2015, which is hereby incorporated by reference herein in its entirety. A track group type box can be extended to include additional data that is track group type specific. FIG. 5 shows an example extension 500 of the track group box type FullBox 502, according to some embodiments. As indicated by 504, the additional data can be specified for a particular track_group_type 506. In some embodiments, the viewport presentation track grouping type 'psrp' can be extended to include additional data to support additional spherical region use cases. The additional use cases can include spherical regions with a number of supported audio and/or other multimedia content (e.g., the tourist guide example) and the multi-story use case discussed herein. For example, the additional attributes can be used to support inter-viewport transition experiences with respect to video transition-in/out and audio fade-out/fade-in effects of the viewports and the rest of the sphere area (e.g., the background).

Examples of one or more additional attributes can include: a transition temporal period (e.g., specifying how long the transition period is when transitioning from one spherical region to another spherical region); a transition range (e.g., specifying an interval within the range [0, 1] between a "from" sphere region and a "to" sphere region upon which the transition effect takes place); video transition effect modes; and/or audio transition effect modes. For example, the W3C SMIL specification, available at https://www.w3.org/TR/smil-boston/smil-transitions.html and incorporated by reference herein in its entirety, describes an example of a transition range.

The transition effect modes can include, for example, video transition effects. For example, a dissolve transition effect can be specified, which can make the first spherical region disappear into the second spherical region. Dissolve transitions can include an additive dissolve transition (e.g., which adds the color information from clip B to clip A, and then subtracts the color information of clip A from clip B); a cross-dissolve transition (e.g., which fades out clip A while fading in clip B); a dip to black transition (e.g., which fades clip A to black, and then fades from black to clip B); a dip to white transition (e.g., which fades clip A to white, and then fades from white to clip B); a dither dissolve transition (e.g., which fades clip A to clip B using a dithering algorithm; and/or a film dissolve transition (e.g., which is a dissolve transition that blends in a linear color space). As another example, an Iris transition can be specified, which is a transition that includes masking a certain shape (e.g., a box, cross, diamond or round shape) to close the picture to a black screen. Iris transitions can include, for example, an Iris Box transition, an Iris Cross transition, an Iris Diamond transition, and/or an Iris Round transition. The W3C SMIL specification referenced above provides examples of Iris transitions. Another example is a page peel transition, such as a page peel transition and/or a page turn transition. A further example is a slide transition, such as a center split transition, a push transition, a slide transition, and/or a split transition. Another example is a 3D motion transition, such as a cube spin transition and/or a flip over transition. In some embodiments, one or more of the video transitions described in Adobe Premiere Pro can be specified. Examples of the Adobe Premiere Pro transitions are available at https://helpx.adobe.com/premiere-pro/using/video-effects-transitions.html, which is hereby incorporated by reference herein in its entirety.

The transition effect modes can include, for example, audio transition effects. For example, a constant gain transition can be used which is a crossfade that changes audio at a constant rate in and out as it transitions between clips. As another example, a constant power crossfade can be used to create a smooth, gradual transition, analogous to the dissolve transition between video clip. As a further example, an exponential fade transition fades out the first clip over a smooth logarithmic curve while fading up the second clip, also over a smooth logarithmic curve. In some embodiments, the audio transition effect modes can include the audio crossfade transitions in Adobe Premiere Pro CC and Audition CC. Examples of the Adobe Premiere Pro CC and Audition CC audio transition effects can be found at https://helpx.adobe.com/premiere-pro/using/audio-effects-transitions.html, which is hereby incorporated by reference herein in its entirety.

The inventors have also discovered and appreciated that the viewport presentation track grouping mechanism can be inefficient, as designed in existing implementations. For example, ISOBMFF lacks a track hierarchy, which can result in an inefficiency inherited when using the track grouping mechanism. The references m40412, "Deriving VR ROI and Viewport related Tracks in ISOBMFF," MPEG 118th meeting, April 2017 and m40413, "OMAF: VR Media Storage and Metadata Signaling for Viewport Dependent Content Processing," MPEG 118th meeting, April 2017, which are hereby incorporated by reference herein in their entirety, explain that IS OBMFF requires tracks related to a viewport presentation to carry the track group boxes. Carrying track group boxes in the individual tracks can become redundant and tedious, especially when VR video is encoded in many sub-picture tracks with multiple quality variants as discussed herein. Additionally, or alternatively, there is no spherical region (e.g., viewport) track, rather the spherical region is a portion (or part) of a sub-picture track that is composed together. Therefore, a decoding device needs content from the sub-pictures in order to render the spherical region.

Existing techniques do not provide for specifying the relationship between a subpicture track and how it relates to a particular viewport, such as specifying that spherical content has a viewport. For example, if a track grouping mechanism is designed as a track group box, the track group box is in the variant tracks. From a metadata perspective, it can be inefficient to have the track group box in each variant track, since each track has the track group box and therefore the track group box is often specified in a redundant manner across each track. Additionally, or alternatively, when using a track grouping box, then the content is typically not the entire spherical region (or viewport), rather it is typically only a piece of the spherical region.

The inventors have developed track derivation mechanisms for VR media that address these and other deficiencies with prior techniques (e.g., including the redundancy and tediousness of existing techniques, such as the ISOBMFF techniques). The techniques associated metadata with a spherical region in a manner that does not require each track to also include the same (often redundant) information. In some embodiments, the track group box is specified in the viewport track. For derived tracks, the derived tracks are tracks themselves, with the exception that the associated media data is derived. Derived tracks are logical, which can, for example, avoid introducing media content overhead and/or duplication. Track derivation is typically performed on-demand in nature, and thus may be processed only on an as-needed basis. Derived tracks can be naturally grouped with and referenced by other related tracks, such as related audio, text, application and metadata tracks.

The techniques can use a track group box to specify metadata, such as to group other related tracks to a multimedia track. As discussed herein, a track group box can be used to group tracks. There can be different types of track group boxes (e.g., since tracks can be grouped together for different purposes, such as for sub-picture composition and/or for multi-source presentation). Each track group box has a track type (e.g., the "track_group_type") that can be used to distinguish among the track group boxes, such as "msrc" to indicate the track belongs to a multi-source presentation, as specified in ISOBMFF. Additionally, there may be many track groups of a same type. A track group identifier (id) (e.g., the "track_group_id") can be used to distinguish different track groups of a same type. Therefore, a track group identifier can be used to identify a track group within the file. The tracks that contain a particular track group type box having the same identifier belong to the same track group. In some embodiments, the techniques can use a track group box of the same type and the same track group identifier to specify metadata, such as the multimedia content and additional content associated with a spherical region.

In some embodiments, the viewport or ROI can be signaled using a derived track. Using a derived track can provide a single track that can be used to represent the content of the variant tracks of a tile. As a further example, using derived tracks can help build a track hierarchy to indicate how tracks are related in terms of composite relationship, e.g., when the derived tracks are derived from variant tracks and (composite) tile tracks.

Figure 6:
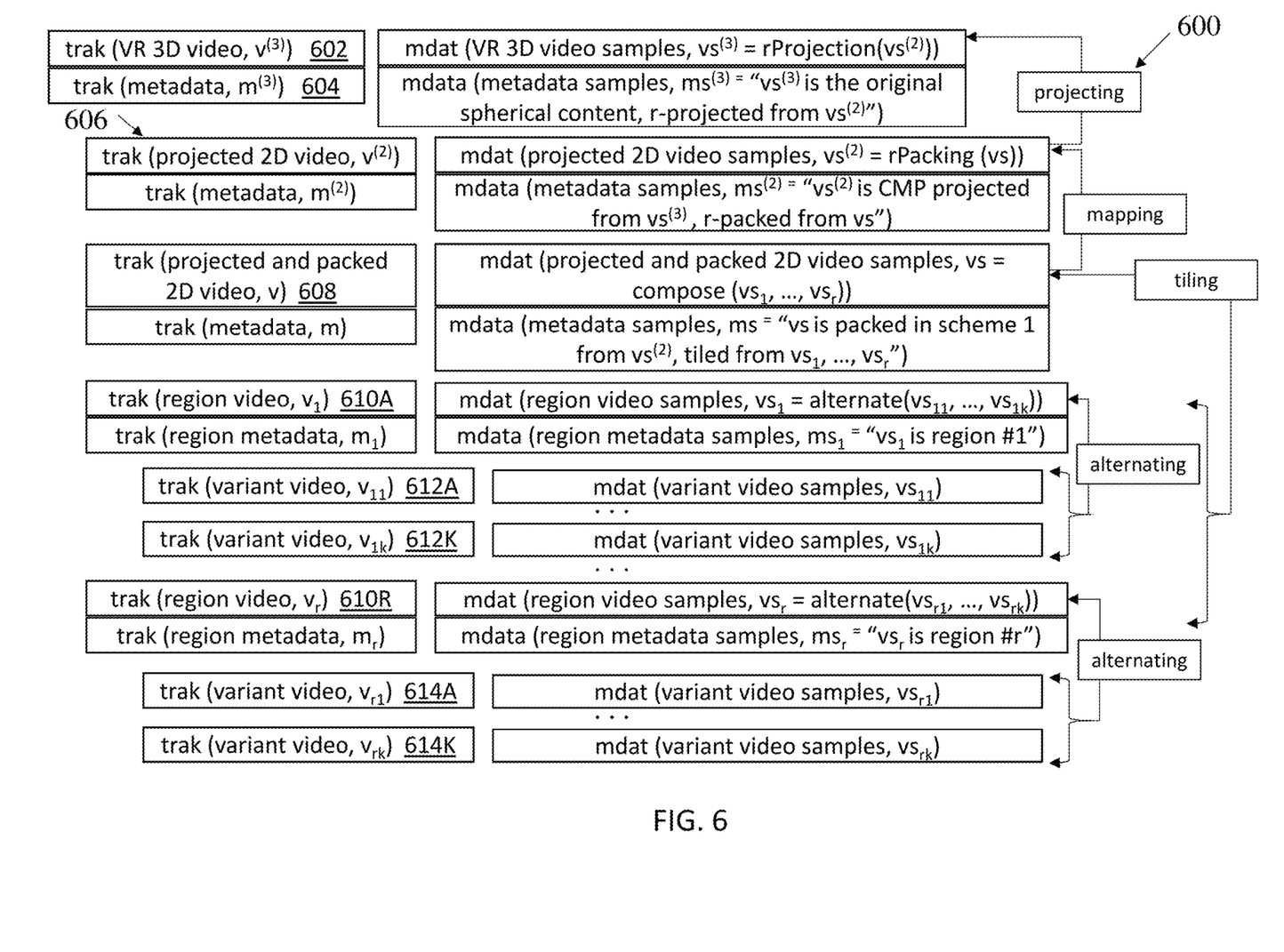
FIG. 6 shows an exemplary track hierarchical structure, according to some embodiments.

FIG. 6 shows an exemplary track hierarchical structure 600, according to some embodiments. The top track 602 is the 3D VR spherical content track, and below the top track 602 is the associated metadata track 604 (each track has associated metadata, as shown and discussed further below). The track 606 is the 2D projected track. The track 608 is the 2D big picture track. The region tracks are shown as tracks 610A through 610R, generally referred to as subpicture tracks 610. Each region track 610 has a set of associated variant tracks. Region track 610A includes variant tracks 612A through 612K. Region track 610R includes variant tracks 614A through 614K. Thus, as shown by the track hierarchy structure 600, a structure can be developed that starts with physical multiple variant region tracks 612, and the track hierarchy can be established for region tracks 612 (sub-picture or tile tracks), projected and packed 2D tracks 608, projected 2D tracks 606, and VR 3D video tracks 604, with appropriate metadata tracks associated them.

In operation, the device selects among the alternating variant tracks to pick the one that is representative of the subpicture region (or subpicture track) 610. The subpicture tracks 610 are composed together into the 2D big picture track 608. Then ultimately the track 608 is mapped, e.g., to rearrange some of the portions to generate track 606. The track 606 is then projected back to the 3D track 602.

Figure 7:
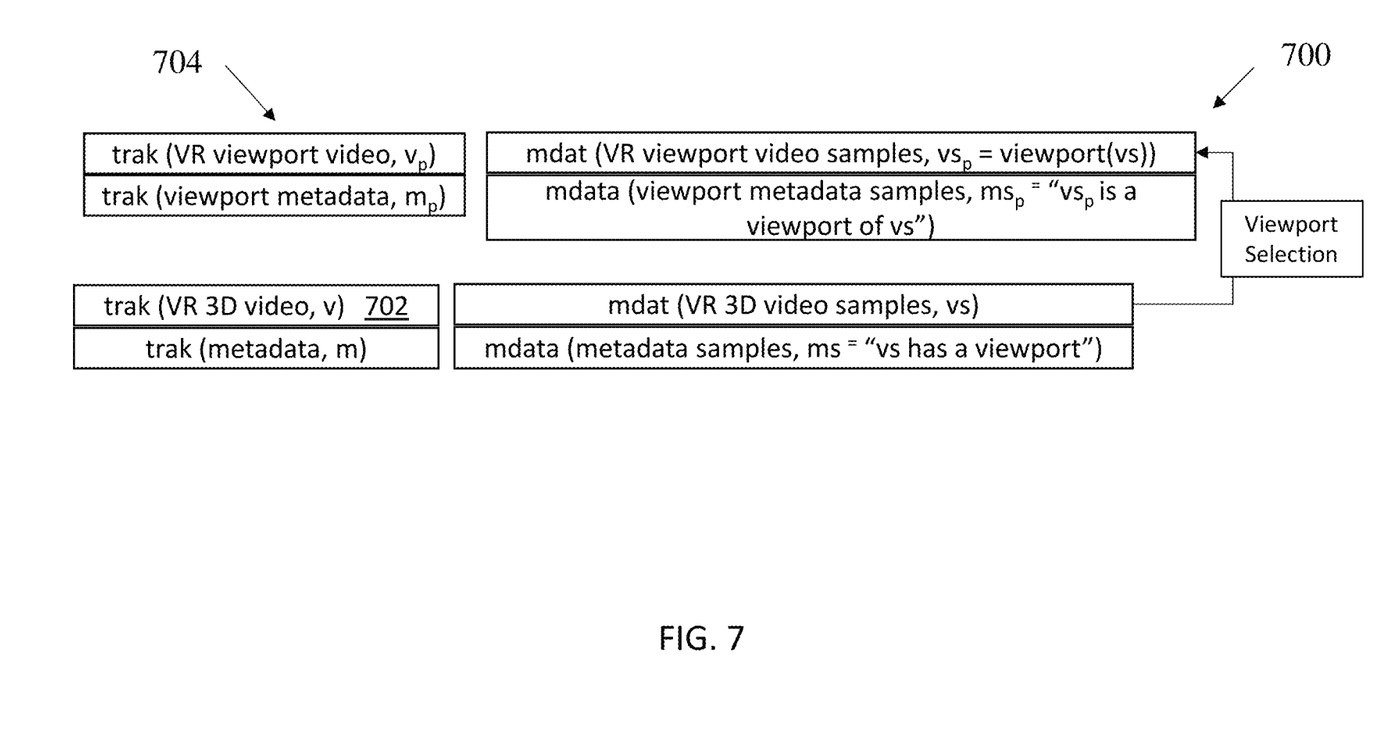
FIG. 7 shows an example spherical region selection, according to some embodiments.

FIG. 7 shows an example spherical region selection, according to some embodiments. Leveraging the hierarchical structure discussed in FIG. 6, with the 3D spherical content track 702, a device can determine the viewport track 704 by performing a viewport selection operation 706, such that the viewport track 704 is the selection of the viewport. Therefore, as discussed above, the group box can just be associated with the 3D spherical content track 704 (e.g., and need not be set for each variant track, such as the variant tracks discussed in conjunction with FIG. 6). Spherical region tracks can therefore be derived from a VR 3D track, together with appropriate associations of their respective metadata tracks. Derived viewport video tracks can make the viewport presentation track grouping much more appropriate, logical and/or efficient (e.g., since the viewport presentation track group boxes need to only be located in the derived viewport video tracks, rather than in each and every variant region video track as noted above).

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
   receiving multimedia data comprising a representation of a multimedia experience associated with at least one spherical region;
   identifying metadata in a derived viewport video track at a first level of a hierarchical track structure of the received multimedia data, wherein:
   the metadata specifies at least one video portion associated with the spherical region and at least one additional multimedia portion associated with the spherical region; and
   the derived viewport video track does not include video media data;

determining, based on the metadata, a second track at a second level of the hierarchical track structure below the first level, wherein the second track comprises the at least one video portion;

determining, based on the metadata, a third track at the second level of the hierarchical track structure, wherein the third track comprises the at least one additional multimedia portion;

generating the video media data for the derived viewport video track by performing a derivation operation to combine the at least one video portion and the at least one additional multimedia portion to generate the video media data, such that the video media data renders the at least one video portion from the second track and the at least one additional multimedia portion from the third track together to present the multimedia experience associated with the spherical region.

2. The method of claim 1, wherein:
identifying the metadata comprises identifying the metadata in a track group box of a same type with a same track group identifier (ID).

3. The method of claim 1, wherein determining the third track comprising the at least one additional multimedia portion comprises identifying one or more of an audio track, a text track, and a caption track.

4. The method of claim 1, further comprising identifying an additional feature associated with the spherical region, wherein the additional feature comprises an inter-spherical region transition effect comprising data indicative of a transition effect for a transition from the spherical region to a second spherical region.

5. The method of claim 4, wherein the transition effect comprises one or more of:
a period of the transition;
a range of a location of the spherical region to a second location of the second spherical region;
an audio effect for the transition; and
a video effect for the transition.

6. An apparatus configured to decode video data, the apparatus comprising a processor in communication with memory, the processor being configured to execute instructions stored in the memory that cause the processor to:
receive multimedia data comprising a representation of a multimedia experience associated with at least one spherical region;
identifying metadata in a derived viewport video track at a first level of a hierarchical track structure of the received multimedia data, wherein:
the metadata specifies at least one video portion associated with the spherical region and at least one additional multimedia portion associated with the spherical region; and
the derived viewport video track does not include video media data;
determining, based on the metadata, a second track at a second level of the hierarchical track structure below the first level, wherein the second track comprises the at least one video portion;
determining, based on the metadata, a third track at the second level of the hierarchical track structure, wherein the third track comprises the at least one additional multimedia portion;
generating the video media data for the derived viewport video track by performing a derivation operation to combine the at least one video portion and the at least one additional multimedia portion to generate the video media data, such that the video media data renders the at least one video portion from the second track and the at least one additional multimedia portion from the third track together to present the multimedia experience associated with the spherical region.

7. The apparatus of claim 6, wherein:
identifying the metadata comprises identifying the metadata in a track group box of a same type with a same track group identifier (ID).

8. The apparatus of claim 6, wherein determining the third track comprising the at least one additional multimedia portion comprises identifying one or more of an audio track, a text track, and a caption track.

9. The apparatus of claim 6, wherein the instructions further cause the processor to identify an additional feature associated with the spherical region, wherein the additional feature comprises an inter-spherical region transition effect comprising data indicative of a transition effect for a transition from the spherical region to a second spherical region.

10. The apparatus of claim 9, wherein the transition effect comprises one or more of:
a period of the transition;
a range of a location of the spherical region to a second location of the second spherical region;
an audio effect for the transition; and
a video effect for the transition.

11. A method for encoding video data, the method comprising:
encoding multimedia data comprising a representation of a multimedia experience associated with at least one spherical region,
comprising:
encoding metadata in a derived viewport video track at a first level of a hierarchical track structure of the received multimedia data, wherein:
the metadata specifies at least one video portion associated with the spherical region and at least one additional multimedia portion associated with the spherical region; and
the derived viewport video track does not include video media data;
encoding a second track at a second level of the hierarchical track structure below the first level, wherein the second track comprises the at least one video portion;
encoding a third track at the second level of the hierarchical track structure, wherein the third track comprises the at least one additional multimedia portion; and
providing the encoded multimedia data to present the multimedia experience associated with the spherical region, such that video media data can be generated for the derived viewport video track by performing a derivation operation to combine the at least one video portion and the at least one additional multimedia portion to generate the video media data.

12. The method of claim 11, wherein encoding the metadata comprises encoding the metadata in a track group box of a same type with a same track group identifier (ID).

13. The method of claim 11, further comprising encoding an additional feature associated with the spherical region, wherein the additional feature comprises an inter-spherical region transition effect comprising data indicative of a transition effect for a transition from the spherical region to a second spherical region.

14. An apparatus for encoding video data, the apparatus comprising a processor in communication with memory, the processor being configured to execute instructions stored in the memory that cause the processor to:

encode multimedia data comprising a representation of a multimedia experience associated with at least one spherical region, comprising:

encoding metadata in a derived viewport video track at a first level of a hierarchical track structure of the received multimedia data, wherein:

the metadata specifies at least one video portion associated with the spherical region and at least one additional multimedia portion associated with the spherical region; and the derived viewport video track does not include video media data;

encoding a second track at a second level of the hierarchical track structure below the first level, wherein the second track comprises the at least one video portion;

encoding a third track at the second level of the hierarchical track structure, wherein the third track comprises the at least one additional multimedia portion; and provide the encoded multimedia data to present the multimedia experience associated with the spherical region, such that video media data can be generated for the derived viewport video track by performing a derivation operation to combine the at least one video portion and the at least one additional multimedia portion to generate the video media data.

15. The apparatus of claim 14, wherein encoding the metadata comprises encoding the metadata in a track group box of a same type with a same track group identifier (ID).

16. The apparatus of claim 14, wherein the instructions further cause the processor to encode an additional feature associated with the spherical region, wherein the additional feature comprises an inter-spherical region transition effect comprising data indicative of a transition effect for a transition from the spherical region to a second spherical region.

* * * * *